Figure 1:
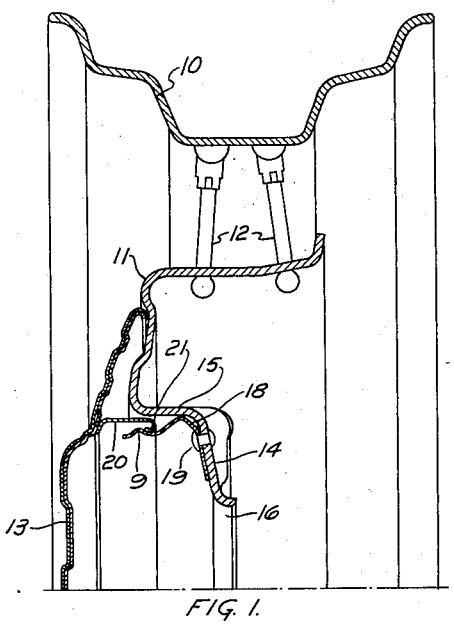
Figure 3:
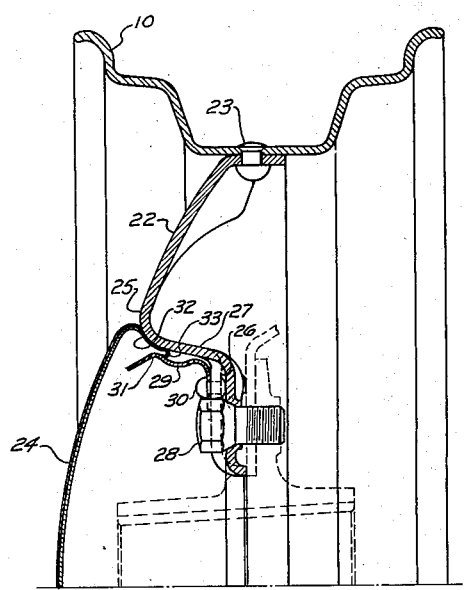
Figure 2:
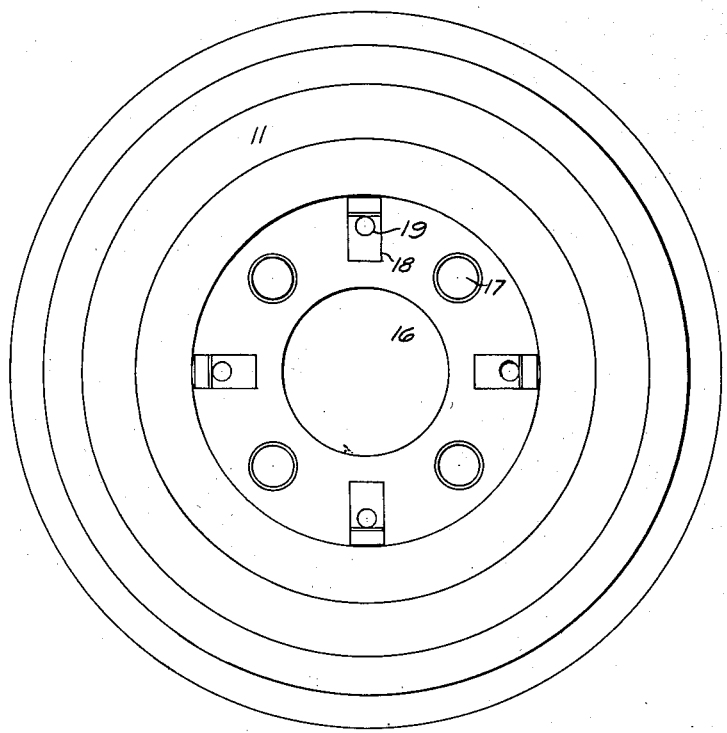

April 26, 1938. H. J. HORN 2,115,420
VEHICLE WHEEL
Filed June 4, 1934

INVENTOR.
Harry J. Horn
BY
Carroll R. Taber
ATTORNEY.

Patented Apr. 26, 1938

2,115,420

UNITED STATES PATENT OFFICE 2,115,420

VEHICLE WHEEL

Harry J. Horn, Lansing, Mich., assignor to Motor Wheel Corporation, Lansing, Mich., a corporation of Michigan Application June 4, 1934, Serial No. 728,898

11 Claims. (Cl. 301—108)

The present invention relates to vehicle wheels and more particularly to a novel arrangement of the hub cap, the outer hub and the means for detachably fastening the hub cap to the wheel. The invention is especially applicable to the demountable at the hub type of steel and wire wheels.

In wire wheels of the demountable at the hub type it is customary to employ a hub shell including a substantially radially extending wheel attaching flange and a substantially axially extending shell portion connected thereto. The attaching studs, by means of which the wheel attaching flange is fastened to the inner hub, are thus located within the axially extending shell and perfectly concealed when a hub cap is applied to the axially outer extremity of the shell.

This same general form of construction is employed in steel wheels of the conventional dish type and of the spoked type. Steel wheels are conventionally formed with an axially dished or depressed central portion to provide a substantially radially extending wheel attaching flange located inwardly of the axially outermost portion of the wheel. The annular portion extending axially outwardly from the wheel attaching flange is comparable to the axially extending shell portion of the wire wheel hub shell.

With the steel wheels, as in the case of the wire wheels, the attaching studs are located within the axially outwardly extending portion of the wheel body and effectively concealed when a hub cap is attached to the axially outermost portion of the wheel.

The wire wheel hub shell of the type mentioned above and the corresponding portion of the steel wheels just described will both be referred to hereinafter as outer hubs.

One of the distinctive features of the present invention is the form and location of the retention devices utilized for detachably fastening the hub cap in position whereby to enclose and conceal the wheel attaching flange and the attaching studs. Heretofore, it has been common practice to provide hub caps with resilient means adapted to engage a rigid portion of the wheel. According to the present invention a plurality of resilient strips of metal, adapted to engage a rigid portion of the hub cap, are permanently secured to the wheel attaching flange. This form is fully as satisfactory as that heretofore employed and considerably more economical.

These retention devices are preferably in the form of L-shaped strips of metal, the shorter leg being attached to the wheel attaching flange and the longer leg projecting axially outwardly therefrom. The outer extremities of the devices are deformed to resiliently engage a cooperating portion of the hub cap. By attaching the retention devices to the wheel attaching flange they are wholly or partially enclosed within the axially extending portion of the outer hub and thus protected from accidental breakage or distortion as would likely result if similar devices were attached to the removable hub cap. The retention devices are of course completely concealed when the hub cap is in position.

Illustrative examples of the invention are shown in the accompanying drawing wherein:

Figure I is a partial sectional view of a conventional wire wheel;

Figure II is a front view of the outer hub shown in Figure I; and

Figure III is a partial sectional view of one form of steel wheel of the spoked type.

The wheel shown in Figure I includes a rim 10 of the drop center type, a hub shell or outer hub 11, spokes 12 connecting the rim and outer hub, and a hub cap 13 secured to the outer hub. The outer hub 11 includes in addition to that portion to which the spokes 12 are connected a radially extending wheel attaching flange 14 and an annular portion 15 connected to the flange 14 and extending axially outwardly therefrom.

The wheel attaching flange 14 as best shown in Figure II is of the usual construction including an enlarged central opening 16 for the reception of an inner hub and a plurality of smaller openings 17 spaced about the large central opening. The smaller openings 17 are adapted to receive conventional attaching studs by means of which the wheel attaching flange is fastened to a radially extending hub flange, not shown.

A plurality of substantially L-shaped resilient strips of metal 18 are connected to the wheel attaching flange 14 by means of rivets 19 joining the shorter leg of each of the devices thereto. The longer leg of each of the resilient strips 18, which will be hereafter referred to as retention devices, project axially outwardly from the wheel attaching flange 14 in spaced relation to the annular axially extending portion 15 of the outer hub. Each of the retention devices 18 is deformed as indicated at 9 adjacent its outer extremity whereby to resiliently engage a cooperating device carried by the hub cap 13.

While any desired number of retention devices may be employed it has been found satisfactory to use only four of these devices uniformly spaced circumferentially about the attaching flange 14 as shown in Figure II. It will be observed that the devices 18 are substantially completely enclosed within the annular axially extending portion 15 of the outer hub. They are thus effectively protected from accidental injury.

An axially inwardly extending annulus 20 is secured to the inner surface of the hub cap 13 radially inwardly of its periphery. The axially inner extremity of the annulus 20 is preferably deformed as indicated at 21 to provide for a cooperative engagement with the deformity 9 at the outer extremity of each of the retention devices 18. The retention devices 18 may be so arranged with respect to the axially extending annular portion 15 of the outer hub that the inner extremity of the annulus 20 contacts the inner surface of the annular portion 15 when in the position shown in Figure I. In this manner the annulus 20 is firmly held in position.

It will be apparent that any suitable form of cooperative means other than the annulus 20 might be employed for effecting engagement with the retention devices 18. The annulus 20 is considered to be the preferred form of cooperating device but it should be understood that the invention is not limited to the particular form of device shown.

The hub cap 13 as shown in Figure I is arranged to conceal the wheel attaching flange 14 and the attaching studs which are associated therewith when the wheel is mounted on an axle. Preferably the periphery of the hub cap extends radially outwardly for a considerable distance beyond the axially extending annular portion 15 and is designed to snugly engage the outer wall of the outer hub 11 whereby to enhance the appearance of the wheel of which it forms a part. The outer hub 11 is formed with a bead adjacent the radially outer periphery of its outer face which constitutes a seat adapted to receive the periphery of the hub cap 13.

The wheel illustrated in Figure III includes a rim 10 similar to that shown in Figure I connected to a metal wheel body 22 of the spoked type by means of rivets 23, and a hub cap 24. The wheel body 22 is provided with an axially dished central portion or outer hub 25. The outer hub includes a radially extending wheel attaching flange 26 and an annular portion 27 joined thereto and extending axially outwardly therefrom.

The wheel attaching flange 26 is mounted upon an inner hub in the usual manner by means of cap screws 28.

The hub cap 24 is detachably secured to the outer hub 25 by means of a plurality of resilient metal retention devices 29. These devices are L-shaped similar to those shown at 18 in Figure I and each has one of its legs fastened to the wheel attaching flange 26 by a rivet 30. The other leg of each device projects radially outwardly from the flange 26 with its outer extremity in spaced relation to the annular portion 27 of the outer hub.

The outer extremity of each of the devices 29 is deformed as indicated at 31 to resiliently engage a portion of the hub cap 24. The hub cap is formed with an inturned flange 32 at its periphery which is designed to conform to the adjacent inner surface of the annular portion 27, as shown. The inner edge of flange 32 is suitably deformed at 33 to cooperatively engage the deformations 31 adjacent the outer extremity of each of the retention devices 29.

When the hub cap 24 is secured in position as shown, it effectively conceals the flange 26, cap screws 28 and retention devices 29. It also forms a smooth joint with the outer wall of the outer hub 25. When the cap 24 is removed, the retention devices 29 are protected from accidental injury by reason of being enclosed within the annular portion 27 of the outer hub 25. The cap 24 may be installed or removed by applying thereto in the proper direction the slight pressure necessary to deflect the outer extremities of the retention devices 29 radially inward so that the deformation 33 may pass over the deformations 31.

As herein described and as disclosed in the drawing, each of the clips is provided with a plurality of oppositely directed bends between their points of attachment and the points of contact between the cover caps and the clips, whereby the clips are readily flexible both axially and radially.

Referring to the form of the invention shown in Figure III, it will be observed that there is a tapered relation between the outer hub 27 and the hub cap flange 32 which, together with the ability of the spring clips to exert axially inward as well as radially outward pressure against the hub cap flange, tends to more or less suck the hub cap 24 into the outer hub. The radially inward displacement of the point of attachment of the clip relative to the point of contact thereof with the hub cap aids this operation.

Only the preferred embodiments of the invention have been shown and described. It should of course be understood that the invention is not limited thereto but is coextensive with the scope of the appended claims.

I claim:

1. The combination with a vehicle wheel having an axially dished central portion of means for detachably connecting a hub cap thereto comprising a plurality of resilient L-shaped retention devices disposed within said dished central portion, one leg of the retention devices being connected to a radially extending portion of the wheel and the other leg extending axially outwardly therefrom said retention devices being capable of flexure from their point of attachment to their free extremity to permit a resilient engagement with a hub cap.

2. A vehicle wheel comprising an outer hub adapted to receive a hub cap, a radial bolting on flange connected to the outer hub, and a plurality of resilient hub cap attaching devices comprising L-shaped clips having their shorter legs secured to said bolting on flange and their longer legs projecting axially therefrom in closely spaced relation to the outer hub, the attachment of the shorter legs to the flange being intermediate the extremities of such legs said attaching devices being capable of flexure from their point of attachment to their free extremity to permit a resilient engagement with a hub cap.

3. A vehicle wheel including, in combination, a radial flange, an annular portion extending axially outwardly from the flange, a cap, and a plurality of resilient L-shaped retention devices, each of said retention devices having one of its legs connected to said flange at a point remote from the junction of said legs and its other leg projecting axially outwardly from said flange in closely spaced relation to said annular portion for engagement with said cap, said retention devices constituting the sole means for attaching the cap to the wheel said retention devices being capable of flexure from their point of attachment to their free extremity to permit a resilient engagement with the cap.

4. A vehicle wheel including a radial flange, an annular portion extending axially outwardly from the flange, and means for attaching a cap to the wheel consisting solely of a plurality of resilient L-shaped retention devices, each of said retention devices having one of its legs connected to said flange at a point remote from the junction of said legs and its other leg projecting axially outward in closely spaced relation to said annular portion said retention devices being capable of flexure from their point of attachment to their free extremity to permit a resilient engagement with a cap.

5. The combination with a wheel having a tapered outer hub decreasing in diameter axially inwardly, of a plurality of resilient spring clips having one of their ends rigidly attached to the wheel adjacent the axially inner extremity of the outer hub and their other ends extending axially outwardly in adjacent relation to the outer hub and a cover cap having an axially extending flange insertable within the outer hub and tapered to conform to the configuration thereof, each of the spring clips being provided with a plurality of oppositely directed bends between the points of attachment and the points of contact of the cover cap with the clips whereby when the cover cap is inserted within the outer hub, said clips exert a resilient pressure thereagainst in a radially outward and axially inward direction.

6. In a wheel, an outer hub having a generally radially extending outer face connected to a substantially radial bolting-on flange by a generally cylindrical wall, said outer face being formed with an annular bead which defines a seat adapted for demountable engagement of a cover cap for completing the outboard symmetrical contour of the outer hub.

7. In a wheel, an outer hub having a generally radially extending outer face connected to a substantially radial bolting-on flange by a generally cylindrical wall, said outer face being formed with an annular bead which defines a seat adapted for demountable engagement of a cover cap for completing the outboard symmetrical contour of the outer hub, a cover cap having a peripheral portion engaging said seat and an attaching portion extending within said cylindrical wall, the cover cap being formed to conceal the bolting-on flange and to constitute a symmetrical continuation of the outer face, and attaching means secured to the outer hub within said cylindrical wall adapted for engagement with said attaching portion of the cover cap.

8. In a wheel, an outer hub having a generally radially extending outer face connected to a substantially radial bolting-on flange by a generally cylindrical wall, a cover cap having a peripheral portion engaging the outer face and an attaching portion extending within said cylindrical wall, the cover cap being formed to conceal the bolting-on flange and to constitute a symmetrical continuation of the outer face, and attaching means secured to the outer hub within said cylinurical wall adapted for engagement with said attaching portion of the cover cap.

9. In combination, a vehicle wheel comprising a radially extending flange, an annular portion projecting axially-outwardly from said flange including a seat for a cover cap, and a plurality of resilient generally L-shaped retaining clips, one leg of each of said resilient retaining clips being directly connected to said radially extending flange and the other leg of said resilient retaining clips extending axially-outwardly therefrom; and a cover cap having a portion engaging said seat, said cap also having retaining means extending axially-inwardly therefrom, said retaining means cooperating with said other legs of said resilient retaining clips to maintain said cap in assembled position.

10. In combination, a vehicle wheel comprising a central web, an annular portion extending generally axially-outwardly from said web, and a plurality of resilient substantially L-shaped retention devices, each of said retention devices having one of its legs connected to said web and its other leg projecting generally axially-outwardly from said web in spaced relation to said annular portion; and a detachable cover cap, said cap being provided with generally axially-inwardly extending mounting means, said mounting means extending inwardly a sufficient distance so that the same lies interposed between said annular portion and said other leg portions of said resilient retaining clips.

11. In combination, a vehicle wheel including a radial flange, an annular portion extending generally axially-outwardly from said flange, and a plurality of resilient generally L-shaped retention devices, each of said retention devices having one leg thereof secured to said flange, the other leg of each of said retention devices being provided with a deformity and projecting generally axially-outwardly from said flange; and a detachable cover cap having retaining means extending generally axially-inwardly therefrom, said retaining means also being provided with a deformity cooperating with said deformity of said resilient retention devices to retain said cap in assembled relation with said wheel.

HARRY J. HORN.